United States Patent Office

3,427,389
Patented Feb. 11, 1969

1

3,427,389
D-HOMO AROMATIC STEROIDS
Derek Burn and Vladimir Petrow, London, England, assignors to The British Drug Houses Limited
No Drawing. Filed Apr. 5, 1965, Ser. No. 445,753
Claims priority, application Great Britain, Apr. 8, 1964, 14,537/64
U.S. Cl. 424—341       13 Claims
Int. Cl. A61k 27/00; C07c 41/00, 43/00

---

ABSTRACT OF THE DISCLOSURE

D-homo-17a-oxo aromatic steroids having 17a-hydroxy or alkoxy and a 17a-haloalkynyl substituents and preparation of same by condensation of corresponding D-homo-17a-ketones with metallic, including Grignard types of metallic derivatives of the appropriate alkyne.

---

This invention is for improvements in or relating to organic compounds and has particular reference to steroidal materials in which ring D is a 6-membered carbocyclic ring.

It is an object of the present invention to provide D-homo aromatic steroids having the general formula

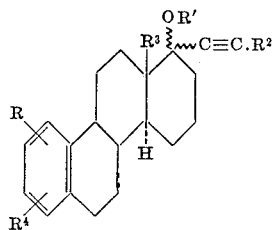

(I)

wherein R and $R^4$ are H, OH, O-alkyl, O-cycloalkyl (containing up to 12 carbon atoms) or lower alkyl (containing up to 3 carbon atoms) and may be the same or different, R′ is H or a lower alkyl group containing up to 3 carbon atoms, $R^2$ is H, lower alkyl containing up to 3 carbon atoms, halogen (in particular chlorine), $CH_2OH$ or $CF_3$, $R^3$ is methyl, ethyl or propyl and wherein additional double bonds and lower alkyl or methylene groups may be present in rings B, C and D. These compounds are of value on account of their claudogenic properties. In general the compounds of the present invention will have an advantageous claudogenic/oestrogenic index. This is a discovery of great significance in the art in that it represents an important advance in the search for claudogenic agents with minimal side effects. By improving the claudogenic/oestrogenic index, the way is open to improved products for fertility control, whether in the form of oestrogen/progestin type combinations administered for 20 days in each monthly cycle, or whether administered by the sequential method, post coitus, or by other regiments.

The products of the present invention may be prepared from the corresponding D-homo-17a-oxo steroids having the general formula (III; wherein R, $R^4$ and $R^3$ are as defined above)

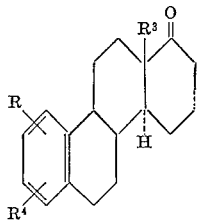

2 by methods which involve the condensation of the D-homo-17a-ketone (III) with metallic, including Grignard types of metallic, derivatives of the appropriate ethyne. In general, such procedures involve Condensations employing metallic derivatives such as sodium, potassium and lithium derivatives of the appropriate ethyne in non-aqueous media including liquid ammonia and subsequently liberating the desired products from the resulting organo-metallic complexes, (2) Condensations employing Grignard derivatives of the appropriate ethynes and subsequently liberating the desired products from the resulting organo-metallic complexes.

The preparation of ethynyl derivatives is conveniently carried out employing potassium acetylide in liquid ammonia or in t-butanol and subsequently liberating the required product from the complex so formed.

The preparation of propynyl derivatives is conveniently carried out employing propynylmagnesium bromide in tetrahydrofuran and subsequently liberating the required product from the complex so formed.

The preparation of chlorethynyl derivatives is conveniently carried out employing sodium chloracetylide in liquid ammonia, or lithium chloracetylide in an ether-tetrahydrofuran mixture, and subsequently liberating the required product from the complex so formed.

The preparation of trifluoropropynyl derivatives is conveniently carried out employing the trifluoropropynyl-magnesium bromide in ether-tetrahydrofuran, or the lithium derivative of the trifluoropropyne in liquid ammonia-tetrahydrofuran, and subsequently liberating the required product from the complexes so formed.

The preparation of 3-hydroxyprop-1-ynyl derivatives is conveniently carried out employing the potassium derivative of propargyl alcohol in t-amyl alcohol or liquid ammonia-pyridine, and subsequently liberating the required product from the complexes so formed.

The corresponding 17a-alkoxy-17a-substituted ethynyl D-homo-steroids having the general formula (I; wherein R′ is lower alkyl) may then be obtained, if desired, either by alkylation in situ during the ethynylation reaction or subsequently by alkylation of the isolated 17a-hydroxy-17a-substituted ethynyl D-homo compound (where $R^2$ is as above).

Thus, for example, an appropriate alkyl halide may be reacted with the alkali-metal derivative of the corresponding 17a-chlorethynyl-17β-hydroxy-steroid in an anhydrous non-hydroxylic solvent (e.g. liquid ammonia, ether or tetrahydrofuran). The alkali-metal derivative may be formed by dissolving the steroid in the non-hydroxylic solvent and then treating with an amide of an alkali-metal in liquid ammonia.

Alternatively the alkali-metal derivative may be formed by the interaction of the corresponding 17-oxo steroid with a chloracetylide of an alkali-metal. In general, a mixture of products, isomeric at C17a as shown in the partial Formulae IVa and IVb.

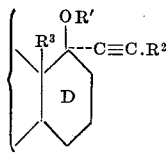
(IVa)

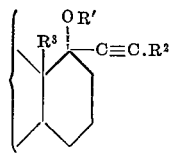
(IVb)

will be obtained. The compounds of the present invention in which the hydroxyl group at C17a has the α-configuration, as in (IVb), possess claudogenic properties while the 17a,β-hydroxy isomers (as in IVa) are likewise claudogenically active.

The invention may be applied to prepare the following novel compounds from the corresponding 17a-oxide steroids:

17a-chloroethynyl-3-methoxy-D-homooestra-1,3,5(10)-triend-17a-ol
17a-chloroethynyl-4-homooestra-1,3,5(10)-triene-3,17a-diol
17a-chloroethynyl-3,17a-dimethoxy-D-homooestra-1,3,5(10)-triene
17a-chlorethynyl-D-homooestra-1,3,5(10)-trien-17a-ol
17a-chlorethynyl-17a-methoxy-D-homooestra-1,3,5(10)-triene
17a-chlorethynyl-4-methyl-D-homooestra-1,3,5(10)-trien-17a-ol
17a-chlorethynyl-17a-methoxy-4-methyl-D-homooestra-1,3,5(10)-triene
17a-chlorethynyl-3,17a-dimethoxy-D-homooestra-1,3,5(10)-6,8-pentane
3,17a-dimethoxy-17a-(prop-1'-ynyl)-D-homooestra-1,3,5(10)-triene
3,17a-dimethoxy-17a-ethynyl-D-homooestra-1,3,5(10)-triene
17a-trifluoropropynyl-3-methoxy-D-homooestra-1,3,5(10)-trien-17a-ol
17a-trifluoropropynyl-3,17a-dimethoxy-D-homooestra-1,3,5(10)-triene
17a-trifluoropropynyl-D-homooestra-1,3,5(10)-trien-3,17a-diol
17a-(3-hydroxyprop-1-ynyl)-D-homooestra-1,3,5(10)-trien-3,17a-diol The compounds of the present invention may be administered orally in the form of suspensions or tablets, admixed with pharmaceutically acceptable carriers. The compositions may take the form of active material admixed with compatible solid diluents and/or tabletting adjuvants such for example as lactose, starch or magnesium stearate. In addition, the products of the invention may be adminstered as injections and suppositories.

Following is a description by way of example of methods of carrying the invention into effect.

Example 1.—Preparation of 17a-chlorethynyl-17a-hydroxy-3-methoxy-D-homooestra-1,3,5(10)-triene

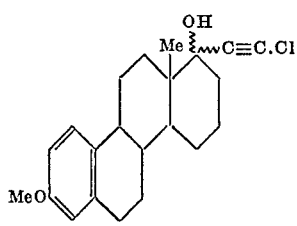

To a solution of methyl lithium [prepared from lithium (1.5 g.) and methyl iodide (8 ml.)] in dry ether (60 ml.) was added, under nitrogen, a solution of trans-dichlorethylene (5 ml.) in dry ether (15 ml.) and the mixture was stirred at room temperature for 2 hours. A solution of D-homooestrone methyl ether (5 g.) in dry tetrahydrofuran (80 ml.) was added over ½-hour and the mixture was refluxed for 3 hours. After cooling in ice, a saturated aqueous ammonium chloride solution was added and the steroidal product was extracted into ether. Evaporation of the dried extract left a gum which was chromatographed on alumina (200 g.). Elution with benzene gave crystalline material which was recrystallised from ether/hexane to give 17a-chlorethynyl-17a-hydroxy-3-methoxy-D-homooestra-1,3,5(10)-triene as needles, M.P. 155° C., $[\alpha]_D^{28}+13.8°$ (c, 1.0 in chloroform).

Example 2.—Preparation of 17a-chlorethynyl-3,17a-dimethoxy-D-homooestra-1,3,5(10)-triene

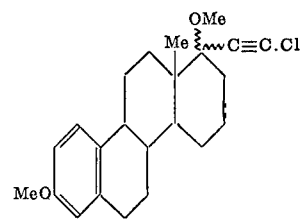

To a solution of sodamide [prepared from sodium (2.5 g.) in liquid ammonia (250 ml.)] was added a solution of 17a-chlorethynyl-17a-hydroxy-3-methoxy-D-homooestra-1,3,5(10)-triene (5 g.) (prepared as in Example 1) in dry tetrahydrofuran (100 ml.) and the mixture was stirred under reflux (ca —40° C.) for 3 hours. Methyl iodide (5 ml.) in dry ether (25 ml.) was then added, stirring was continued for a further 3 hours and the mixture was poured into water. The steroid was extracted into ether, and the residue obtained on evaporation of the dried extract was crystallised from methylene chloride-methanol to give 17a-chlorethynyl-3,17a-dimethoxy-D-homooestra-1,3,5(10)-triene as needles, M.P. 170° C., $[\alpha]_D^{26}-16°$ (c, 1.25 in chloroform).

Example 3.—Tablets containing 0.05 mg. of 17a-chloroethynyl-3,17α-dimethoxy-D-homooestra-1,3,5(10-triene

| | Mg. |
|---|---|
| 17a - chlorethynyl - 3,17a - dimethoxy-D-homo-oestra-1,3,5(10)-triene | 0.05 |
| Lactose | 109 |
| Starch | 13 |
| Starch paste, 15% w./w., a sufficient quantity. | |
| Magnesium stearate | 1.3 |
| Starch, sufficient to make 129.6 mg. | |

The first three ingredients are thoroughly mixed together, dried, and the mixture granulated with sufficient of the 15% starch paste. The resultant granules are tray-dried at 50° C., processed through a No. 20 mesh sieve and the lubricant (magnesium stearnate) added, together with enough starch to produce the required weight. After thorough mixing, tablets each weighing 129.6 mg. are compressed from the mixture, using punches of a suitable shape and diameter.

Example 4.—17α-trifluoropropynyl-3-methoxy-D-homoestra-1,3,5(10)-trien-17a-ol

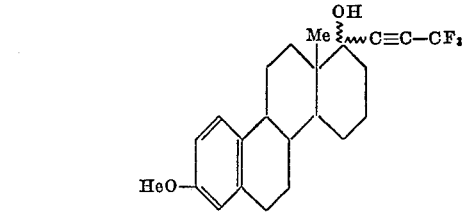

To magnesium (0.94 g.) suspended in anhydrous ether (15 ml.) under nitrogen, with exclusion of moisture, in a carefully-dried apparatus fitted with Dry-Ice reflux condenser, was added, with stirring, during 30 minutes, ethyl bromide (4.5 g.) in ether (15 ml.). When reaction ceased, the mixture was cooled to —70° C. and anhydrous 3,3,3-trifluoropropyne (12 ml., measured at approximately —60° C.) prepared by the method of W. G. Finnegan and W. P. Noris, J. Org. Chem., 1963 28, 1139) was distilled into the mixture. The cooling-bath was removed and the mixture was stirred under reflux for 1½ hours. D-homooestrone 3-methyl ether (2.0 g.) in anhydrous tetrahydrofuran (100 ml.) was added and the mixture was stirred at room temperature for 16 hours, excess of trifluoropropyne being allowed to boil off. Dilute aqueous ammonium chloride solution was added dropwise with stirring, the mixture was extracted with ether and the ethereal solution was washed with ammonium chloride solution and then with water, dried over sodium sulphate, and solvent was evaporated at reduced pressure. The residue was purified by chromatography on alumina, eluting with a mixture of benzene and ether, followed by recrystallisation from aqueous methanol, affording colourless crystals of 17a-trifluoropropynyl - 3-methoxy-D-homooestra-1,3,5(10)-trien-17a-ol $\lambda_{max.}$ 286 m$\mu$ ($\epsilon$, 1,890) $\lambda_{max.}$ 278 m$\mu$ ($\epsilon$, 1,990)

$\nu_{max.}^{CCl_4}$ 3620, 2250 cm.$^{-1}$ $\nu_{max.}^{CS_2}$ 1275, 1148, 1045 cm.$^{-1}$ Example 5.—17a-trifluoropropynyl-3,17a-dimethoxy-D-homooestra-1,3,5(10)-triene

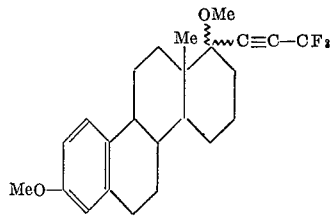

Sodium metal (0.23 g.) and a trace of ferric nitrate were added to liquid ammonia (50 ml.) and the mixture was stirred under reflux until the blue colour disappeared. The mixture was cooled to approximately −60° C. and 17a - trifluoropropynyl - 3-methoxy-D-homooestra-1,3,5 (10)-trien-17a-ol (0.85 g.) in anhydrous tetrahydrofuran (25 ml.) was added slowly during 10 minutes, and the mixture was stirred for 1½ hours. Methyl iodide (0.35 ml.) in tetrahydrofuran (10 ml.) was added during 10 minutes, stirring was continued at approximately −60° C. for a further 3 hours, and the mixture was poured onto ice. The precipitate was collected and purified from methanol, affording 17a-trifluoropropynyl-3,17a-dimethoxy-D-homooestra-1,3,5(10)-triene, as a crystalline solid, $\lambda_{max.}$ 286 m$\mu$ ($\epsilon$, 1880) $\lambda_{max.}$ 278 m$\mu$ ($\epsilon$, 1,985)

$\nu_{max.}^{CCl_4}$ 2250 cm.$^{-1}$ $\nu_{max.}^{CS_2}$ 1275, 1148, 1045 cm.$^{-1}$ Example 6.—17a-trifluoropropynyl-D-homooestra-1,3,5(10)-trien-3,17a-diol

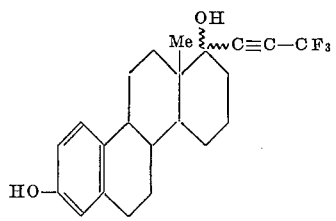

Lithium (0.97 g.) and a trace of ferric nitrate were added to anhydrous liquid ammonia, and the mixture was stirred under reflux until the blue colour disappeared, and then cooled to −70° C. 3,3,3-trifluoropropyne (12 ml., measured at approximately −60° C.) was distilled into the mixture, the cooling-bath was removed, and the mixture was stirred under reflux for 1 hour. D-homo-oestrone (6 g.) in anhydrous tetrahydrofuran (200 ml.) was added, and the mixture was stirred under reflux for 4 hours. Ammonium chloride (5 g.) was added and the ammonia was allowed to evaporate. The residue was extracted with ether and the ethereal solution was washed with water, dried over sodium sulphate, and solvent evaporated at reduced pressure. Purification by chromatography on alumina, eluting with mixtures of benzene and ether, and with ether, followed by recrystallisation from benzene, afforded 17a-trifluoropropynyl-D-homo- estra-1,3,5(10)-trien-3,17a-diol as a colourless solid, $\lambda_{max.}$ 281 m$\mu$ ($\epsilon$, 2,110) $\lambda_{max.}$ 287 m$\mu$ ($\epsilon$, 1,780)

$\nu_{max.}^{CS_2}$ 1277, 1148, 1045 cm.$^{-1}$

What we claim is:
1. D-homo aromatic steroids of the formula

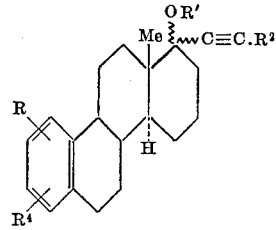

wherein R and R$^4$ are H, OH, O-alkyl, O-cycloalkyl (containing up to 12 carbon atoms) or lower alkyl (containing up to 3 carbon atoms) and may be the same or different, R' is H or a lower alkyl group containing up to 3 carbon atoms, and R$^2$ is H, lower alkyl containing up to 3 carbon atoms, halogen, CH$_2$OH or CF$_3$.

2. 17a-chlorethynyl-17a-hydroxy - 3-methoxy-D-homo-oestra-1,3,5(10)-triene.

3. 17a-chlorethynyl-3,17a-dimethoxy- D-homooestra-1,-3,5(10)-triene.

4. 17a-trifluoropropynyl-3-methoxy-D-homooestra-1,3,5 (10)-trien-17a-ol.

5. 17a-trifluoropropynyl-3,17a - dimethoxy-D-homooes-tra-1,3,5(10)-triene.

6. 17a-trifluoropropynyl -D-homooestra-1,3,5(10)-trien-3,17a-diol.

7. A pharmaceutical preparation comprising a D-homo aromatic steroid as claimed in claim 1 in admixture with one or more solid or liquid pharmaceutically acceptable carriers.

8. A pharmaceutical preparation comprising 17a-chlorthynyl-3,17a-dimethoxy-D-homooestra-1,3,5(10)-triene in admixture with lactose, starch and magnesium stearate.

9. A process for the preparation of a D-homo aromatic steroid of the formula

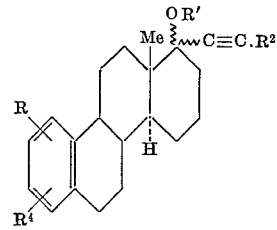

wherein R and R$^4$ are H, OH, O-alkyl, O-cycloalkyl (containing up to 12 carbon atoms) or lower alkyl (containing up to 3 carbon atoms) and may be the same or different, R' is H or a lower alkyl group containing up to 3 carbon atoms, and R$^2$ is H, lower alkyl containing up to 3 carbon atoms, halogen, CH$_2$OH or CF$_3$, which process comprises condensing the corresponding D-homo-17a-oxo steroid having the formula

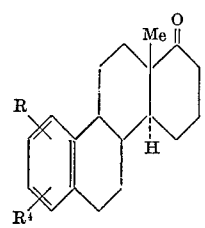

wherein R and R$^4$ are as defined above, with metallic, including Grignard types of metallic, derivatives of the appropriate ethyne.

10. A process as claimed in claim 9 wherein the D-homo-17a-oxo steroid is condensed by employing sodium, potassium or lithium derivatives of the appropriate ethyne in non-aqueous media and the resulting organo-metallic complex is treated with ammonium chloride solution to liberate the product from the complex.

11. A process as claimed in claim 10 wherein the non-aqueous media is liquid ammonia.

12. A process as claimed in claim 9 wherein the D-homo-17a-oxo steroid (III) is condensed by reaction with a reagent selected from the group consisting of (a) sodium chloracetylide in liquid ammonia and (b) lithium chloracetylide in an ether-tetrahydrofuran mixture, and the complex so formed is treated with ammonium chloride solution to liberate the chlorethynyl derivative.

13. A process as claimed in claim 9 wherein the D-homo-17a-oxo steroid (III) is condensed by reaction with a reagent selected from the group consisting of (a) trifluoropropynylmagnesium bromide in ether-tetrahydrofuran and (b) the lithium derivative of trifluoropropyne in liquid ammonia-tetrahydrofuran, and the complex so formed is treated with ammonium chloride solution to liberate the trifluoropropynyl derivatives.

References Cited

UNITED STATES PATENTS 3,230,142   1/1966   Spero _____ 167—55

F. CACCIAPAGLIA, Jr., *Primary Examiner.*

U.S. Cl. X.R.

260—611; 424—346, 339, 343